United States Patent [19]

Henderson et al.

[11] 4,028,941

[45] June 14, 1977

[54] SENSORS FOR LOW TEMPERATURE APPLICATION

[75] Inventors: Timothy M. Henderson; Gilbert H. Wuttke, both of Ann Arbor, Mich.

[73] Assignee: KMS Fusion, Inc., Ann Arbor, Mich.

[22] Filed: Oct. 4, 1974

[21] Appl. No.: 513,333

[52] U.S. Cl. .......................... 73/339 R; 116/114.5
[51] Int. Cl.² ......................................... G01K 11/02
[58] Field of Search ............... 73/17 A, 339 R, 356, 73/358; 116/114 R, 114.5

[56] References Cited

UNITED STATES PATENTS

| | | | |
|---|---|---|---|
| 3,047,405 | 7/1962 | Lanier | 116/114.5 |
| 3,107,529 | 10/1963 | Johnston | 73/339 |
| 3,513,313 | 5/1970 | Schwartz | 73/355 |
| 3,631,720 | 1/1972 | Weinstein et al. | 73/358 |
| 3,701,282 | 10/1972 | Peterson | 73/358 |
| 3,817,204 | 6/1974 | Schitten | 73/17 |
| 3,818,614 | 6/1974 | Meurer | 73/17 |

Primary Examiner—Herbert Goldstein
Attorney, Agent, or Firm—Barnes, Kisselle, Raisch & Choate

[57] ABSTRACT

A method and apparatus for low temperature sensing which uses gas filled micro-size hollow glass spheres that are exposed in a confined observation area to a low temperature range (Kelvin) and observed microscopically to determine change of state, i.e., change from gaseous state of the contained gas to condensed state. By suitable indicia and classification of the spheres in the observation area, the temperature can be determined very accurately.

4 Claims, 2 Drawing Figures

U.S. Patent  June 14, 1977  4,028,941

SENSORS FOR LOW TEMPERATURE APPLICATION

This invention relates to Sensors for Low Temperature Application and more particularly to a method for accurately determining low temperatures of bodies of los mass.

Previously, devices in the form of thermocouples and resistance thermometers have been utilized for these purposes, but these have the disadvantage of having relatively large heat capacities and thus affect the temperature of the body which is to be measured.

It is also an object of the invention to provide a method for sensing extremely low temperatures very inexpensively and for calibration of large heat capacity sensors.

Other object and features of the invention will be apparent in the following description and claims in which the principles of the invention, together with the best mode presently contemplated, are set forth.

Figure 1:
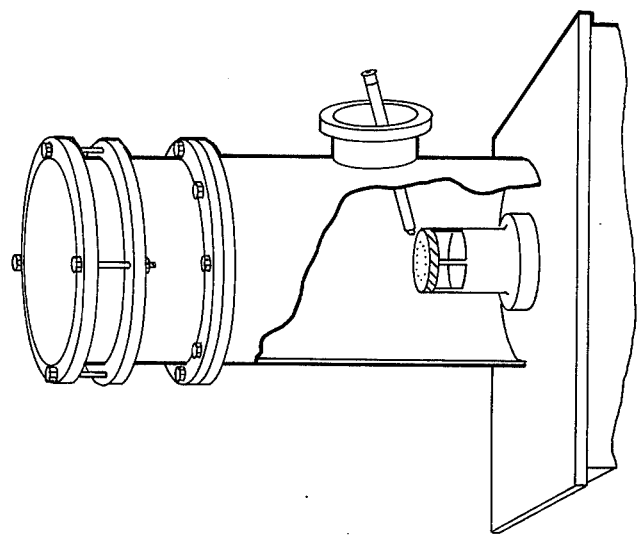

DRAWINGS accompany the disclosure and the various views thereof may be briefly described as follows:

FIG. 1, a view of a cryogenic chamber with a microscope attachment.

Figure 2:
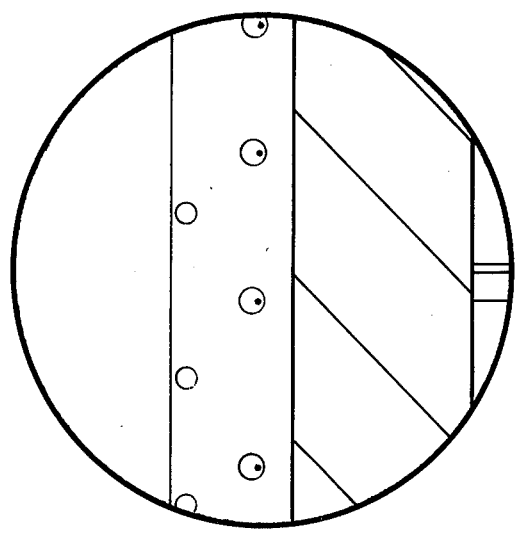

FIG. 2, an enlarged view of a microscopic field taken from FIG. 1.

Small hollow glass spheres are commerically available and can be sized so that each has a known diameter and a known wall thickness which makes it possible to determine the interior volume. These spheres may be filled by gas diffusion and this is preferably accomplished at a high temperature such as 500°–700° K so that most gases in a matter of a few days time will permeate into the sphere after which the sphere may be lowered to room temperature and the gas will be retained for long periods of time.

For any fill gas it is possible to condense and freeze the gas by lowering the temperature of the glass spheres. For the volume and initial pressure and temperature, the temperature at which condensation occurs can be accurately predicted and subsequently measured. There is a clearly observable phase transition in the form of condensation and solidification of the fill gas which can be readily observed in hollow spheres of a diameter, for example, of about 100 micrometers which have been filled with an initial pressure and temperature equal to 50 to 100 atmospheres at 300° K. The minimum magnification for reliable observation of these phase changes is approximately 30 to 60 X. Accordingly, when these hollow spheres are suitably filled and characterized, and brought into good thermal contact with the object, the temperature of which is to be measured, then the hollow spheres may be observed during cooling. The temperature of the object can then be finally bracketed by this method by observing in which spheres condensation occurs.

The drawings shows the arranging of a plurality of filled hollow glass spheres in a series of small circles located at different points on an object in the field of a microscope. By observing in which of the spheres a phase change has occured, it is possible to determine the temperature.

If the method for filling the above-mentioned hollow glass spheres is diffusion as described, the gases are presently limited to hydrogen, deuterium, tritium, helium and neon. This puts the temperature sensing range in the low Kelvin range. If other methods of filling the glass spheres are used, the selection of gases is essentially unlimited. This filling can be accomplished, for example, by using various gases as blowing agents in the making of the hollow spheres but under these circumstances, the pressure ranges are more limited and high magnification is therefore required.

It will be appreciated that in each area of observation, a series of hollow filled glass spheres would be arranged, each having a different gas and/or internal pressure or varying in size so that a range of spheres in any particular area under observation would be provided. Each of these would be classified so that the temperature at which condensation occurs would be known. Accordingly, when under observation in a cryogenic condition, a particular phase change in any sphere would register the temperature at that particular area. It will be appreciated that the glass spheres are practically negligible as far as their heat absorption capacity is concerned so that they would not alter the basic temperature of the part being checked in any discernable amount.

What we claim is:

1. A method of determining the temperature of a body or of a specific region of a system or component of a system which comprises:
   a. disposing a plurality of gas filled glass microspheres in an observation area on a part, the temperature of which is to be determined, the spheres being selected to have varying phase change characteristics by reason of differences in gas and pressure of contained gas, and
   b. observing any change of phase from gas to condensate in the respective spheres to determine the ambient temperature of the part.

2. A method of determining the temperature of a body or of a specific region of a system or component of a system which comprises:
   a. disposing a plurality of gas filled glass microspheres in close array on a part, the temperature of which is to be observed, the spheres being classified according to the internal volume and pressure wherein a phase change from gas to condensate will occur at a predetermined different temperature for each, and
   b. observing the array microscopically to determine a phase change in any particular sphere whereby the ambient temperature of the part may be determined.

3. A method of determining the temperature of a body or a specific region of a system or component of a system which comprises:
   a. selecting a plurality of tiny glass spheres having a size range up to about 100 micrometers,
   b. filling said spheres with a gas under graduated pressures in ranges up to about 100 atmospheres when reduced to a room temperature,
   c. disposing a plurality of the filled glass spheres, selected on a basis of the contained gas and pressure, on a part, the temperature of which is to be determined, and
   d. microscopically observing the change of phase from gas to condensate in the individual spheres to determine the ambient temperature of the part.

4. A method of determining the temperature of a body or a specific region of a system or component of a system which comprises:
   a. selecting a plurality of tiny glass spheres having a size range up to about 100 micrometers, b. filling said spheres with a gas selected from the group consisting of hydrogen, deuterium, tritium, helium and neon by gas diffusion through the walls of the spheres by subjecting the exterior of said spheres to a particular gas under pressure at temperatures from 500° to 700° Kelvin for a time to permit the gas to permeate into the sphere, c. disposing a plurality of the filled glass spheres, selected on a basis of the contained gas and pressure, on a part, the temperature of which is to be determined, and d. microscopically observing the change of phase from gas to condensate in the individual spheres to determine the ambient temperature of the part.

* * * * *